(12) United States Patent
Zamer et al.

(10) Patent No.: US 10,936,991 B2
(45) Date of Patent: Mar. 2, 2021

(54) LOCATION DETECTION DEVICES FOR USE IN A COURIER SERVICES NETWORK

(71) Applicant: PAYPAL, INC., San Jose, CA (US)

(72) Inventors: Kamal Zamer, Austin, TX (US); James Marcos Duran, Austin, TX (US); Krishna Sai Pendela Bala Venkata, Austin, TX (US); Praveen Nuthulapati, Austin, TX (US); Jayasree Mekala, Austin, TX (US); Sivakumar Sirumugai Palanisamy, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 246 days.

(21) Appl. No.: 16/107,898

(22) Filed: Aug. 21, 2018

(65) Prior Publication Data

US 2019/0057348 A1  Feb. 21, 2019

Related U.S. Application Data

(63) Continuation of application No. 14/680,868, filed on Apr. 7, 2015, now Pat. No. 10,055,707.

(51) Int. Cl.
| | | |
|---|---|---|
| *G06Q 10/08* | (2012.01) | |
| *G06Q 50/00* | (2012.01) | |
| *H04W 4/029* | (2018.01) | |
| *H04W 4/35* | (2018.01) | |

(52) U.S. Cl.
CPC ....... *G06Q 10/0834* (2013.01); *G06Q 10/083* (2013.01); *G06Q 10/08355* (2013.01); *G06Q 50/01* (2013.01); *H04W 4/029* (2018.02); *H04W 4/35* (2018.02)

(58) Field of Classification Search
CPC ... G06Q 10/0834; G06Q 10/083; G06Q 50/01
USPC .................................................. 705/334, 330
See application file for complete search history.

(56) References Cited

U.S. PATENT DOCUMENTS

| | | | |
|---|---|---|---|
| 9,269,103 B1* | 2/2016 | Kumar | ............... G06Q 30/0605 |
| 10,366,436 B1* | 7/2019 | Kumar | ................. G06Q 10/087 |
| 2002/0152174 A1* | 10/2002 | Woods | ................... G06Q 10/08 705/60 |
| 2003/0225592 A1* | 12/2003 | Algazi | ................. G06Q 10/083 705/330 |
| 2004/0103067 A1 | 5/2004 | Mattern et al. | |
| 2005/0182956 A1 | 8/2005 | Ginter et al. | |
| 2005/0250489 A1 | 11/2005 | Lazaridis | |

(Continued)

*Primary Examiner* — Florian M Zeender
*Assistant Examiner* — Christopher R Buchanan
(74) *Attorney, Agent, or Firm* — Haynes and Boone, LLP

(57) ABSTRACT

There are provided systems and methods for location detection devices for use in a courier services network. A first user may travel to a location for a particular reason, such as item purchases or appointments. While at the location, the user may be identified at the location by a server offering courier services to a seller and a second user purchasing items from the seller. Based on the first user's reason for traveling to the location and other indicia of trustworthiness or fraud, the server may determine whether the first user can be trusted as a courier. If the user is trusted as a courier, the server may update the first user and the seller to arrange delivery of the item to another location set by the second user. The first user may also be provided with additional items for the second user to deliver to further locations.

20 Claims, 8 Drawing Sheets

(56) References Cited

U.S. PATENT DOCUMENTS

| | | | |
|---|---|---|---|
| 2007/0185778 A1* | 8/2007 | Weng | G06Q 30/0609 |
| | | | 705/26.41 |
| 2011/0055046 A1 | 3/2011 | Bowen et al. | |
| 2012/0246090 A1* | 9/2012 | Griffith | G06Q 10/08 |
| | | | 705/330 |
| 2014/0149269 A1 | 5/2014 | Kantarjiev et al. | |
| 2014/0188750 A1 | 7/2014 | Seiler | |
| 2014/0297470 A1 | 10/2014 | Ramadge et al. | |
| 2015/0058163 A1 | 2/2015 | Lenahan et al. | |
| 2015/0066799 A1* | 3/2015 | Scipioni | G06Q 10/083 |
| | | | 705/337 |
| 2015/0081581 A1* | 3/2015 | Gishen | G06Q 10/083 |
| | | | 705/330 |
| 2015/0178778 A1* | 6/2015 | Lee | G06Q 30/0264 |
| | | | 705/14.58 |
| 2015/0213403 A1* | 7/2015 | Dorpfeld | G06Q 10/0833 |
| | | | 705/333 |
| 2015/0294261 A1* | 10/2015 | Adell | G06Q 10/083 |
| | | | 705/330 |
| 2015/0317597 A1* | 11/2015 | Shucker | G06Q 10/0833 |
| | | | 235/375 |
| 2016/0232487 A1 | 8/2016 | Yonker | |

\* cited by examiner

LOCATION DETECTION DEVICES FOR USE IN A COURIER SERVICES NETWORK

CROSS REFERENCE TO RELATED APPLICATIONS

This application is a continuation of U.S. patent application Ser. No. 14/680,868 filed on Apr. 7, 2015, the content of which is hereby incorporated by reference in its entirety for all purposes.

TECHNICAL FIELD

The present application generally relates to location detection devices for use in a courier services network and more specifically to detecting users nearby a seller that may assist the seller and a buyer of an item in possession of the seller with courier services for delivery of the item.

BACKGROUND

Buyers may purchase items from online sellers and require delivery of the items to their personal or work address, or to another destination of their choosing. Delivery services offer buyers and sellers assistance in delivering items to such locations; however, delivery services are often restricted to certain pickup/delivery times, delivery schedules, and costs. Thus, when a seller is local to a buyer, the buyer may incur time delays and monetary costs unnecessarily. With local sellers, the buyer may be presented with the option to pick up the item themselves, which requires additional time and effort on the part of the buyer. Moreover, in certain circumstances where an item is needed immediately (e.g., electronics required for a work, medications, or other high priority items), the user may not be able to visit the seller location. A courier service may be utilized to deliver items to a buyer but may add significant cost to the buyer or seller. Buyers may have friends, family, coworkers, or employees that may assist them in picking up items, but this may similarly add time and expense to delivery, as well as inconveniencing others. Thus, systems and devices that improve delivery services are needed.

Figure 1:
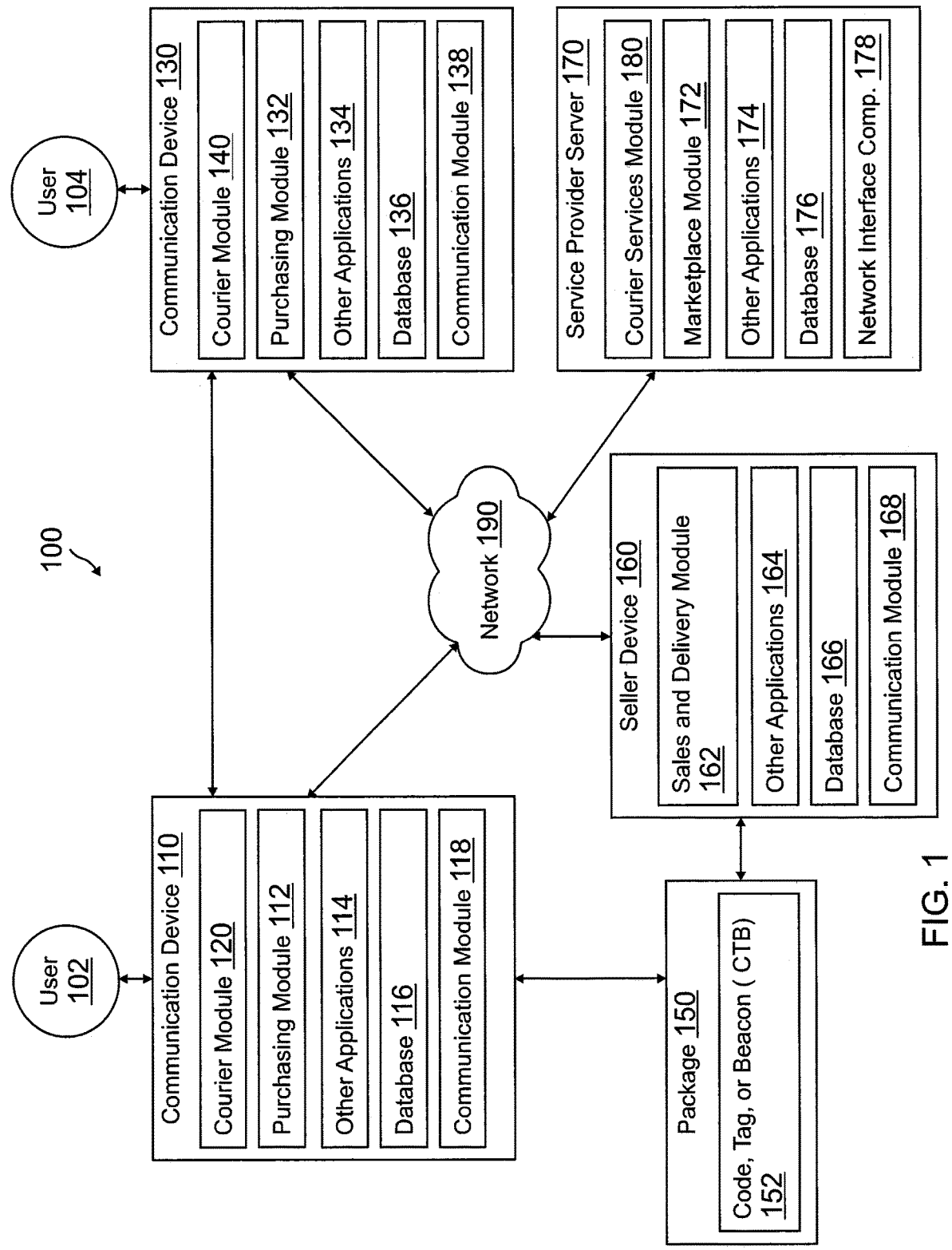
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized by location detection devices for use in a courier services network. Systems suitable for practicing methods of the present disclosure are also provided.

A first user (e.g., a buyer) may purchase one or more products, goods, and/or services (referred to as an "item" or "items" herein) from a second user (e.g., a seller). The first user and the second user may be located within the same town, county, or other geographic region such that the first user may accept delivery of the item from the second user through a delivery means. A third user (e.g., a courier) may be located nearby to the second user so that location information for the third user may be associated with, correlated to, or otherwise match the second user's location (e.g., within the same location or in proximity to the second user's location).

The third user may be in possession of a communication device that may be utilized to establish the location information for the third user. For example, the communication device of the third user may connect with a seller or merchant device or through a wireless beacon at the seller's location or a merchant location nearby the seller's location when the communication device is in proximity (e.g., a range of coverage) of the device/wireless beacon. The seller/merchant device or the wireless beacon may receive information identifying the third user, which may be used to generate the location information for the third user with a location for the device or wireless beacon that connects with the communication device. Thus, these devices/wireless beacons may provide short range wireless communications with users' communication devices, such as through Bluetooth Low Energy (BLE), LTE Direct, or other communication protocol. Beacons may be set up at the seller or merchant location, such as at or nearby an entrance to the location, throughout the location and sub-areas of the location (e.g., at sales aisles, booths, or other sub-areas), and/or at checkout counters where a user pays for a transaction. The beacons may provide additional functionality, such as establishing a connection with another device to provide the user with information and communicate information about the user's location to service provider server. Similarly, the devices may be located at seller/merchant checkout counters or may be in the possession of the seller/merchant. The devices/beacons may communicate with devices in possession of users in order to connect to the device and determine the user is in proximity to the beacon. In other embodiments, the communication device may receive the information over a network connection with another entity, such as a seller/merchant device, seller/merchant server, service provider, online marketplace, or other information provider.

Location information for the third user may also be established using a schedule for the third user as well. For example, a schedule for the third user may include appointments for the third user, a meeting list, and/or travel information (e.g., travel routes between two or more locations, such as a home/work address and a time for travel between such locations, which may be determined from a user's calendar, travel history or patterns, social network postings, etc.). The third user may input the schedule to the communication device and/or to a server, such as a service provider server. The third user's location information may also be generated from purchases by the third user. Thus, if the third user recently visited the seller's location or a merchant location nearby the seller's location and purchased another item, the third user may be identified with the location where the third user purchased the other item.

Location information may be communicated to a service provider server. The service provider may correspond to a merchant, online marketplace selling items for the seller and/or other sellers, a payment provider, or other type of service provider offering courier services to buyers, sellers, and couriers. The server may execute a module having specialized hardware and/or software that may arrange courier services for buyers and sellers. The server may then process the location information for the third user (the courier) and determine whether the location information matches any sellers requiring delivery (e.g., the second user having an item for delivery to the first user). Once matched, the server may further determine whether the third user is trusted as a courier. A determination of whether the third user is trusted as a courier may be based on past transactions and/or deliveries by the third user. For example, if the third user is a common seller using the server for a marketplace and/or courier services, the server may determine a higher degree of confidence in the third user as a courier. Moreover, if the third user has successfully delivered items in the past, the third user may have a higher trust rating (e.g., a trust relationship with the service provider). Additionally, if the server has payment information, billing information, and/or personal information, the server may also determine a higher trust rating for the third user. The third user may also be trusted as a courier based on the third user's relationship with the first and/or second users. Thus, if the third user is a social networking contact, co-locating user, shared account owner for one or more online accounts with the first or second users, and/or personal relationship partner (e.g., spouse) of the first or second user, the server may also have a higher degree of confidence in the third user as a courier.

The determination of whether the third user is trusted as a courier may also be based on a reason for the third user being in proximity to the second user, the seller. For example, there may be a higher degree of trust in a user visiting the seller to conduct business with the seller as the seller may have financial information, identification, or other information from the user. The reason for visiting may be determined from the location information (e.g., a purchase from the second user or a nearby merchant, an appointment nearby the second user, a home/work address for the third user nearby the second user, a travel route passing by the second user to other locations, etc.) or may be determined using other information known about the third user (e.g., if the third user is a courier available to deliver items). Once a determination has been made that the third user is trusted as a courier, the server may provide an authorization to the second user, the seller, to release the item to the third user for delivery to the first user. The server may provide information to the third user allowing the third user to pick up the item from the second user, such as a location for pick up. The server may utilize an authorization code so that the second user knows whether to trust the third user as a courier when the third user arrives at the location for pick up. The authorization code may correspond to a code that allows release of the item from a storage locker or device at the location (e.g., a password or lock code). The authorization code may also correspond to a shared secret that may be provided to the second user and the third user and verified with each other when in each other's presence to allow for release of the item. Further still, the authorization code may correspond to a code given to the third user, who provides the code to the second user for verification with the service provider when the second user receives the code from the third user.

The server may also provide delivery information to the third user for the item. The delivery information may include a location that the first user is accepting delivery of the item. Thus, the third user may receive a location and/or route for delivery of the item. The server may view a plurality of couriers near the seller and select the third user as the courier for the item to the first user's delivery location based on a radius of coverage of the third user. The radius of coverage may be set by the third user, or may be selected by the user based on a mode of transportation by the third user (e.g., walking, a bicycle, and/or a vehicle such as a car). The radius of coverage may also depend on how soon the first user needs the item delivered to the location (e.g., when the first user needs the item or when the first user may arrive at the delivery location to pick up the item). The radius of coverage may correspond to a certain distance from the second user's location, such as a distance in any direction the third user may travel. The radius of coverage may be dynamic depending on changing conditions, such as traffic, weather, and/or change in location of the first user (e.g., if the first user moves closer or farther from the delivery location). The radius of coverage may also depend on travel plans of the third user, such that if the third user is traveling between two or more locations, the radius of coverage may cover any delivery locations a certain distance away from the travel route that the third user may take between the locations. If the delivery location for the item to the first user is within the radius of coverage, the third user may be either flagged as a potential courier and/or selected as the courier. Thus, the server may take into account where the third user can deliver items to delivery locations and/or the amount of time required to deliver the items.

The delivery location may be set by the first user or may be determined based on travel patterns, routes, and/or locations of the first user. Thus, the first user may specify that the item is delivered to a home or work address. The first user may also view other locations acting as delivery locations based on agreements between the seller and/or the service provider and the locations. The other locations may correspond to participating merchants, such as retail locations and merchant storefronts. The first user may also arrange a meeting location with the third user, such as a merchant location, landmark, etc. The server may also determine a delivery location for the first user based on information known about the first user. For example, the server may select a delivery location based on whether the first user travels to or by the delivery location. Thus, a gas station, storefront, or other location may be used as a delivery location if the first user comes within a certain distance to the delivery location. The server may also consider a time that the first user comes in proximity to the delivery location and when the first user requires the item.

The first user may also further act as a courier for additional items delivered to the delivery location for the first user. For example, the second user, the seller, may have two items, a first item for the first user, and a second item for a fourth user (e.g., a second buyer). The server may determine that the fourth user's delivery location is not in a radius of coverage of the third user. However, the fourth user's delivery location may be nearby a location that the first user travels to or by in a travel route, and thus within a radius of coverage for the first user. Thus, the server may determine that the third user can retrieve the first and second items and deliver the first and second items to the first user's delivery location so that the first user may then retrieve their item, the first item, from the first user's delivery location, and deliver the second item to the fourth user's delivery location. Similar to above, the first user may be trusted and selected as a courier based on similar information for the first user and the third user's information. Additionally, further chains of delivery may be utilized, so that the fourth user may even further be used to deliver additional items delivered to the fourth user's delivery location.

The third user (and other user's where a chain of delivery is used) may also be offered incentives to deliver the item to the delivery location for the first user. An incentive may be an offer of a discount, rebate, gift certificate, or other benefit provided to the third user. The incentive may be with or provided by the second user, the seller, or may be with or provided by the service provider (e.g., an offer for use with a payment account, online marketplace, and/or courier service). The incentive may also be benefits for an account with the second user or the service provider. For example, the third user may receive a high account rating indicating trustworthiness as a seller and/or courier. The benefit for the account may unlock further offers and/or account uses by the third user. Thus, the third user may be offered use of other services and/or may receive additional offers. The third user may also be trusted with items of high value with a higher account rating. The third user may receive feedback from the first and/or second users, which may be displayed with the account. The buyer, seller, and/or the service provider may determine the incentives for the third user. The third user may also receive monetary incentives from the seller and/or service provider. Thus, individuals and private parties can be used to improve delivery of items from sellers to buyers.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LiNUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user 104, a communication device 110, a communication device 130, a package 150, a seller device 160, and a service provider server 170 in communication over a network 190. User 102 may travel to a location with communication device 110 so that location information for the user may be established that associates user 102 with the location. The location may be the same or similar (e.g., in proximity) to a seller's location corresponding to seller device 160. User 104 may utilize communication device 130 to purchase an item from the seller, such as through a marketplace offered by service provider server 170. User 104 may request delivery of the item from a courier. Service provider server 170 may determine that user 102 is in proximity to the seller and may determine whether user 102 is trusted as a courier. Service provider server 170 may also determine whether a location for delivery set by user 104 is within the radius of coverage of user 102. If user 102 is trusted as a courier and able to deliver the item (e.g., the delivery location is within the radius of coverage of user 102), the seller may provide package 150 to user 102 for delivery to the location, which may track the location and delivery of the item. The seller may also provide further items for delivery by user 102 to additional locations within a radius of coverage for user 102.

Communication device 110, communication device 130, seller device 160, and service provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 190.

Communication device 110/130 may be implemented as a communication device that may utilize appropriate hardware and software configured for wired and/or wireless communication with communication device 130/110, seller device 160, and/or service provider server 170. For example, in one embodiment, communication device 110/130 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110/130 of FIG. 1 contains a courier module 120/140, a purchasing module 112/132, other applications 114/134, a database 116/136, and a communication module 118/138, respectively. Courier module 120/140, purchasing module 112/132, and other applications 114/134 may correspond to executable processes, procedures, and/or applications with associated hardware. In other embodiments, communication device 110/130 may include additional or different hardware and software as required.

Courier module 120/140 may correspond to one or more processes to execute modules and associated devices of communication device 110/130 to provide location information or other information used to generate location information to service provider server 170, receive courier requests for user 102/104, respectively, to deliver one or more items to a location, receive delivery information and/or an authorization code for pickup of the items, and receive incentives for delivery of the item. In this regard, courier module 120/140 may correspond to specialized hardware and/or software utilized by communication device 110/130 to first establish location information for user 102/104, respectively. Location information may be determined by service provider server 170 using a schedule, calendar, travel route, destination, work/home location, or other information that may determine whether user 102/104 is at or traveling to a location. Thus, courier module 120/140 may provide service provider server 170 with such information, for example, data pulled from an application corresponding to the aforementioned information (a scheduling, mapping, etc., application). Courier module 120/140 may also provide purchasing information for recent purchases to service provider server 170. However, such information may also be provided by seller device 160 or a merchant device performing the transaction.

In order to establish location information, courier module 120/140 may also establish connections with one or more other devices or wireless beacons to generate the location information. Courier module 120/140 may connect with seller device 160 and/or a wireless beacon at a location for seller device 160 to establish that user 102 is located at or nearby the seller's location. In other embodiments, a merchant device or wireless beacon for a merchant nearby the seller corresponding to seller device 160 may connect with communication device 110/130. In this regard, a communication between courier module 120/140 and seller device 160/merchant device/wireless beacon may provide and/or verify the identity of user 102/104, including transmission of an identifier for user 102/104 and/or communication device 110/130, or other information used to process a check-in for user 102/104. Thus, check-in information may be established when a connection is made by courier module 120/140 with one or more of seller device 160, the merchant device, and the wireless beacon.

In order to establish the connection, courier module 120/140 may receive short range wireless communications through communication module 118/138 at the location and transmit information to seller device 160, the merchant device, and/or the wireless beacon, including check-in information for a check-in process that associates user 102/104 with the device connected with communication device 110/130. For example, a wireless beacon may be located at and throughout the seller's or merchant's location (e.g., at an entrance, through sub-areas of the merchant location, and/or at a checkout/payment location in merchant location) and set up to communicate with communication device 110/130 when communication device 110/130 is in proximity to the wireless beacon. Thus, the wireless beacon may be range limited to connect only with devices (e.g., communication device 110/130 within the specified area, such as a radius around wireless beacon, a distance away from wireless beacon, and/or a signal direction for wireless beacon. When communication device 110/130 enters the proximity radius for the wireless beacon (or seller device 160 in various embodiments), communication device 110/130 and the one or more of wireless beacons may connect and check-in information including an identifier for user 102 and/or communication device 110/130 may be transmitted to the connected beacons of wireless beacon.

Courier module 120/140 may execute in the background of an operating system of communication device 110/130 and be configured to establish connections, using communication module 118/138 of communication device 110/130, with one or more of seller device 160, the merchant device, and the wireless beacon. The connection may be established with or without input from user 102/104. For example, seller device 160, the merchant device, and/or the wireless beacon may broadcast a token, such as a universally unique identifier (UUID), for reception by courier module 120/140, as explained herein. Courier module 120/140 may utilize communication module 118/138 of communication device 110/130 to receive the token. If courier module 120/140 acknowledges the UUID as identifying the merchant location, seller device 160, the seller, a merchant, the wireless beacon, and/or service provider server 170 (e.g., if courier module 120/140 determines the UUID corresponds to a request to establish a communication channel and/or process and complete a check-in), courier module 120/140 may transmit an identifier corresponding to user 102/104 and/or communication device 110/130 back to seller device 160 and/or the wireless beacon. Courier module 120/140 may utilize communication module 118/138 of communication device 110/130 to communicate with seller device 160, the merchant device, and/or the wireless beacon (e.g., over near field communication, Bluetooth, Bluetooth Low Energy, radio, infrared, LTE Direct, or other communication protocol). The identifier from communication device 110/130 may include, be transmitted with, concatenated with, or otherwise bundled with the identifier received from wireless beacon. In other embodiments, different information may be communicated by communication device 110/130, such as an identifier for user 102/104, a name or other personal information for user 102/104, or other identifying information. Thus, the information does not need to be utilized to process and/or complete a check-in in all embodiments. Once a connection is established with wireless beacon, the process may associate user 102/104 with the location of the device connected to communication device 110/130.

Once a connection is established with seller device 160 and/or wireless beacon by courier module 120/140, location information for user 102/104 may be established and communicated to service provider server 170. Service provider server may utilize the location information to determine whether user 102/104 may be utilized to deliver an item. In various embodiments, courier module 120/140 may provide additional information for use in determining whether user 102/104 can deliver an item, such as travel plans, destinations, schedules, or other information used to determine whether user 102/104 will travel to or nearby a delivery location. Courier module 120/140 may also provide a mode of transportation used by user 102/104 and/or radius of coverage preferences. Service provider server 170 may determine whether user 102/104 may be utilized as a courier using the aforementioned information, as discussed herein. Courier module 120/140 may also provide information used to make a trust determination of whether user 102/104 may be trusted as a courier. Such information may include past courier services provided by user 102/104, account information for user 102/104, financial/personal information for user 102/104, social networking or other contact information for user 102/104, or other available information.

If user 102/104 is selected as a courier by service provider server 170, courier module 120/140 may receive communications from service provider server 170 having the courier services request. The request may include a location for pickup of the item(s) to be delivered and one or more delivery locations. The request may also include information about the item(s) for pickup, a time for pickup and/or delivery, insurance information for the item(s), incentives to act as a courier, travel routes for delivery of the item(s), one or more travel routes to take to the delivery location(s), or other information used for delivery. Courier module 120/140 may display the information to user 102/104 through a device output interface. Moreover, courier module 120/140 may allow for user 102/104 to accept or decline the courier request and may communicate the decision to service provider server 170.

Courier module 120/140 may display authorization codes for use in picking up one or more items. The authorization code may be a shared secret with the seller corresponding to seller device 160. The authorization code may also be a code the seller uses to authorize user 102/104 using service provider server 170. The authorization code may be used with a locker, dispenser, or storage means that releases the item to user 102/104. Courier module 120/140 may also receive a code used for delivery of the item(s), such as a code used to place the items in a storage locker or a code used to authorize a recipient of the item(s). Where user 102/104 delivers multiple items to a delivery location and a further user is required to deliver one or more of those items to another location, the authorization code (or another authorization code) may also be utilized to authorize further couriers in the chain of delivery.

Courier module 120/140 may further be utilized to request courier service by user 102/104. For example, user 104 may have purchased an item from the seller corresponding to seller device 160. User 104 may request courier services using courier module 140 of communication device 130. User 104 may request any courier for delivery, or may select user 102 (e.g., from previous knowledge of user 102 or selecting a courier closest to the seller's location through a map of available couriers). User 102 may view the courier request through courier module 120 of communication device 110 and information necessary for pickup and delivery of the item(s). The seller may have one or more further items for delivery to a further location within user 102's radius of coverage. Thus, the seller may provide the item(s) for user 102 to user 104 on pick up as well as the further item(s). Courier module 120 may display pickup information for user 102's item(s) and the further item(s) to user 102, which may retrieve the items and deliver the further item(s) using delivery information provided through courier module 120.

Purchasing module 112/132 may correspond to one or more processes to execute modules and associated specialized hardware of communication device 110/130 to provide select one or more items for purchase from the seller associated with seller device 160 and generate payment tokens to seller device 160 for use in processing and completing a payment to the seller associated with seller device 160 for the item(s) that may be delivered using courier services provided by service provider server 170. In this regard, purchasing module 112/132 may correspond to specialized hardware and/or software utilized to view the item(s) for purchase and generate a purchase order for the item(s). For example, purchasing module 112/132 may allow for user 102/104 to view items available from the seller for purchase, select one or more of the items for purchase, and purchase/checkout the selected item(s). In some embodiments, purchasing module 112/132 may correspond more generally to a web browser configured to view information available over the Internet or access a website corresponding to the seller, a merchant or service provider having an online marketplace (e.g., service provider server 170), and/or payment service provider. In other embodiments, purchasing module 112/132 may correspond to a dedicated application for the seller and/or a service provider offering an online marketplace to purchase the items from the seller.

Thus, purchasing module 112/132 may also provide a convenient interface to permit user 102 to select payment options and provide payment for the item(s) to seller device 160. Purchasing module 112/132 may be implemented as a user interface enabling user 102 to enter payment options for storage by communication device 110/130, provide those payment options on checkout/payment of one or more items, and complete a transaction for the item(s) through a purchase request for the item(s). Purchasing module 112/132 may utilize user financial information, such as a credit card, bank account, or other financial account, as a payment instrument when providing payment information in the form of a payment token to seller device 160. Additionally, purchasing module 112/132 may utilize a user account with payment provider, such as service provider server 170, as the payment instrument. In various embodiments, the payment token may be communicated to seller device 160 directly or through one or more of wireless beacon. In other embodiments, the payment token may be communicated directly to service provider server 170. The payment token may also include identification of the item(s) for purchase and a request to purchase the items. The payment token may be generated using payment information (e.g. a payment instrument, such as a user account or payment card information) from purchasing module 112/132 and the payment token may be transmitted by purchasing module 112/132 to one or more of seller device 160 and/or service provider server 170. Service provider server 170 may provide payment for the purchase request to the merchant or seller device 160 may process the payment account in the payment token to receive payment for the transaction. After payment and checkout of the item(s), user 102/104 purchasing the item(s) may utilize courier module 120/140 to arrange delivery of the item(s). Purchasing module 112/132 may also be utilized to redeem incentives provided by the seller and/or service provider server 170 for acting as a courier.

In various embodiments, communication device 110/130 includes other applications 114/134 as may be desired in particular embodiments to provide features to communication device 110/130. For example, other applications 114/134 may include security applications for implementing client-side security features, programmatic client applications for interfacing with appropriate application programming interfaces (APIs) over network 190, or other types of applications. Other applications 114/134 may also include email, texting, voice and IM applications that allow a user to send and receive emails, calls, texts, and other notifications through network 190. In various embodiments, other applications 114/134 may include financial applications, such as banking, online payments, money transfer, or other applications associated with a payment provider. Other applications 114/134 may include applications used with one or more auxiliary devices of communication device 110/130, such as touch input applications, camera applications, microphone applications, and/or other applications that may receive user input. Other applications 114/134 may include applications that provide information for use in courier requests by service provider server 170, such as schedules, travel routes, or other information. Other applications 114/134 may also include mapping applications for use in displaying delivery locations and travel to delivery locations. Other applications 114/134 may include device interfaces and other display modules that may receive input from user 102 and/or output information to user 102. For example, other applications 114/134 may contain software programs, executable by a processor, including a graphical user interface (GUI) configured to provide an interface to the user.

Communication device 110/130 may further include database 116/136 stored to a transitory and/or non-transitory memory of communication device 110/130, which may store various applications and data and be utilized during execution of various modules of communication device 110/130. Thus, database 116/136 may include, for example, identifiers such as operating system registry entries, cookies associated with courier module 120/140 and/or other applications 114/134, identifiers associated with hardware of communication device 110/130, or other appropriate identifiers, such as identifiers used for payment/user/device authentication or identification. Database 116/136 may include information to effectuate the check-in, such as an identifier for user 102 and/or communication device 110/130. Database 116/135 may include information used by service provider server 170 when determining whether to utilize user 102/104 as a courier (e.g., location information, scheduling information, recent purchases, travel routes, etc.). Moreover, database 116/136 may store received information, such as courier service requests and delivery instructions.

Communication device 110/130 includes at least one communication module 118/138 adapted to communicate with seller device 160, a wireless beacon, and/or service provider server 170. In various embodiments, communication module 118/138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118/138 may communicate directly with seller device 160, a merchant device, and/or a wireless beacon using short range communications, such as Bluetooth Low Energy, LTE Direct, WiFi, radio frequency, infrared, Bluetooth, and near field communications.

Package 150 may correspond to a physical package containing an item for delivery to another user using a courier service, as discussed herein. For example, package 150 may include an item that user 104 has ordered for delivery by user 102 to a location selected by user 104 and/or service provider server 170. Package 150 may include packaging to secure the item as well as identification information for use in pickup of package 150 from the seller corresponding to seller device 160 and delivery of package 150 to the delivery location. Package 150 may include information used in the release of package 150, such as a code used to authorize package 150's release to user 102. Package 150 may also include tracking information and/or devices. A code, tag, or beacon (CTB) 152 may be placed on the outside, attached to, within, or otherwise associated with package 150. CTB 152 may include an alphanumeric, bar, QR or other code that may be scanned or otherwise read when picked up, in route to a location, and/or delivered to the location to allow for tracking of package 150. CTB may also correspond to a tag or beacon, such as a RFID tag, wireless beacon using short range wireless communication devices, or other type of tracking device, which may be used to track pickup, transportation, and delivery of package 150. Package 150 may be released to user 102 by the seller corresponding to seller device 160.

Seller device 160 may be maintained, for example, by a merchant, private online seller, or other person/entity, which may sell one or more items and/or services to user 102/104 online, for example, through a website and/or online marketplace. Seller device 160 includes one or more processing applications which may be configured to interact with communication device 110/130 and/or service provider server 170 to facilitate purchase and sale of items and arrange deliver of such items. In such embodiments, seller device 160 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although only a single seller device is shown, a plurality of seller devices may function similarly. While seller device 160 is discussed as a device local to a seller's location, a server at or remote from the seller location may also be utilized (e.g., a seller device using a warehouse to store items). Moreover, one or more of the features discussed below (e.g., item sales) may be provided by service provider server 170, for example, an online marketplace provided by EBAY®, Inc. of San Jose, Calif., USA or STUBHUB®, Inc. of San Francisco, Calif., as well as sales and payment services offered by PAYPAL®, Inc., of San Jose, Calif. Thus, in some embodiments, one or more of the below described modules, processes, and/or functions may instead be performed by service provider server 170 or another entity and vice versa.

Seller device 160 of FIG. 1 contains a sales and delivery module 162, other applications 164, a database 166, and a communication module 168. Sales and delivery module 162 and other applications 164 may correspond to processes, procedures, and/or applications, for example, a software program, executable by a hardware processor. In other embodiments, seller device 160 may include additional or different modules having specialized hardware and/or software as required.

Sales and delivery module 162 may correspond to one or more processes to execute modules and associated specialized hardware of seller device 160 to provide a sales interface permitting a seller corresponding to seller device 160 to complete a transaction with a buyer for an item, arrange delivery of the item using a courier, and view courier information and authorization codes for release of package 150 having the item to the courier. In this regard, sales and delivery module 162 may correspond to specialized hardware and/or software to first view item inventory information for items offered for sale by the seller when inventory is accessible by the seller. The seller may use sales and delivery module 162 to enter item information for the available items in the inventory and update and maintain the inventory as the items are sold, new items are entered, and/or as old items are replaced. Thus, sales and delivery module 162 may also update item information, such as a price for the item, available stock amount of the item, description of the item, discounts or benefits associated with purchase of the item, or other information. Sales and delivery module 162 may generate sales postings for the items, for example, on a website for the seller and/or an online merchant marketplace offered by service provider server 170. Sales and delivery module 162 may correspond to a web browser, in certain embodiments, used to access a website or online marketplace to generate the sales postings, or sales and delivery module 162 may correspond to a dedicated application used to generate online sales postings.

Once a user has selected an item for purchase, sales and delivery module 162 may arrange sale of the item. In various embodiments, sales and delivery module 162 may receive input for the item, such as entry of an item number, lookup of the item in a menu/sales interface, scan of a barcode, etc. In other embodiments, the user purchasing the item or the seller may enter the items through an interface. After selecting items for purchase, purchasing module 112/132 and/or sales and delivery module 162 may generate a purchase request for the selected item(s), for example, by gathering the item(s)/service(s) into a transaction and providing a checkout interface for completion of the transaction using payment information for user 102/104. For example, the purchase request may be generated from one or more items identified by user 104 as desirable for purchase. The checkout interface may include an option for user 104 to provide payment for the transaction using purchasing module 132 by submitting a purchase request to sales and delivery module 162 (e.g., a payment token including a payment account or payment card in a payment token, where purchasing module 132 has information necessary to provide payment through the payment instrument). In other embodiments, user 104 may provide the payment instrument to seller device 160 (e.g., a physical payment card or entry of a login to a payment account), where sales and delivery module 162 generates the purchase request for the transaction with the submitted payment instrument. Sales and delivery module 162 may further generate transaction histories for purchases by one or more users. For example, a receipt for user 104 may be generated and provided to user 104.

Sales and delivery module 162 may also be used to arrange courier services for package 150. As discussed herein, user 104 may have purchased an item for delivery that the seller corresponding to seller device 160 has packaged into package 150 for delivery. Sales and delivery module 162 may receive delivery information, whether user 104 has selected to receive delivery of package 150 using a courier, and information for a courier (e.g., user 102) chosen by service provider server 170 for delivery of package 150. The information identifying user 102 as the courier may include identification information and an authorization code for use in releasing package 150 to user 102. Moreover, sales and delivery module 162 may display a time for pickup of package 150 by user 104 as well as any pickup instruction (e.g., a place for pickup, delivery vehicle requirements, etc.).

In various embodiments, seller device 160 includes other applications 164 as may be desired in particular embodiments to provide features to seller device 160. For example, other applications 164 may include security applications for implementing client-side security features, programmatic client applications for interfacing with appropriate application programming interfaces (APIs) over network 190, or other types of applications. Other applications 164 may contain software programs, executable by a processor, including a graphical user interface (GUI), configured to provide an interface to a user of seller device 160 (e.g., a merchant or merchant employee). In various embodiments where not provided by sales and delivery module 162, seller device 160 may include connection and/or communication applications, which may be utilized to communication information to communication device 110/130 and/or service provider server 170. Such information may include pickup and delivery information about package 150, authorization code verification requests, and other information.

As discussed herein, seller device 160, a merchant device, and/or a wireless beacon at a merchant location for seller device 160 may communicate with communication device 110/130 in possession of user 102 through Bluetooth Low Energy (BLE), LTE Direct, or another communication protocol receivable by communication device 110/130. When establishing a connection, seller device 160, the merchant device, and/or the beacon may emit a communication signal including an identifier (e.g., a Universally Unique Identifier (UUID) (e.g., through a connection application of other applications 164 and/or through the wireless beacon connected with seller device 160). Communication device 10 may execute specialized hardware and/or software to passively monitor for the short range wireless communications. When communication device 110/130 detects the signal and verifies the one or more identifiers, both communication device 110/130 and seller device 160/the wireless beacon may ramp up in power and establish a connection, which may identify user 102 as located at the merchant location.

The request to establish the connection may be communicated as a short range wireless communication (e.g. a BLE protocol communication) including a "wake up" process for communication device 110/130. In other embodiments, the request and/or connection may utilize near field communication, radio communication, infrared communication, Bluetooth communication, or WiFi communication. Additionally, although seller device 160, the merchant device, and/or the wireless beacon may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices (e.g., communication device 110/130) and establishment of a connection for data transfers.

Additionally, seller device 160 includes database 166. Database 166 may include inventory, sales, and/or other item information used by sales and delivery module 162 to generate a transaction, such as item information, pricing, inventory information merchant application interface components, and/or merchant information. Database 166 may further include purchase requests for the transaction, which may be processed by seller device 160 and/or communicated to service provider server 170 for processing of a payment. Database 166 may also store received information, such as courier information for a courier picking up package 150 in possession of the seller corresponding to seller device 160.

In various embodiments, seller device 160 includes at least one communication module 168 adapted to communicate communication device 110/130 and/or service provider server 170 over network 190. In various embodiments, communication module 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices. Communication module 168 may also communicate with communication device 110/130 directly using short range wireless communications.

Service provider server 170 may be maintained, for example, by an online payment service provider, which may provide courier services to user 102, user 104, and a seller corresponding to seller device 160. Service provider server 170 may also provide an online marketplace used by the seller to sell one or more items to user 102/104. In this regard, service provider server 170 includes one or more processing applications which may be configured to interact with communication device 110/130 and/or seller device 160 to facilitate sales of items and/or arrangement of courier services. In one example, service provider server 170 may be provided by EBAY®, Inc. of San Jose, Calif., STUBHUB®, Inc. of San Francisco, Calif., and/or PAYPAL®, Inc. of San Jose, Calif., USA. However, in other embodiments, service provider server 170 may be maintained by another service provider, which may provide marketplace and courier services to user 102 and/or the seller associated with seller device 160. Moreover, in various embodiments, one or more of the applications, processes, and/or features discussed below in reference to service provider server 170 may be included in seller device 160 or another entity.

Service provider server 170 of FIG. 1 includes courier services module 180, a marketplace module 172, other applications 174, a database 176, and a network interface component 178. Courier services module 180, marketplace module 172, and other applications 174 may correspond to executable processes, procedures, and/or applications with associated hardware. In other embodiments, service provider server 170 may include additional or different modules having specialized hardware and/or software as required.

Courier services module 180 may correspond to one or more processes to execute modules and associated specialized hardware of service provider server 170 to receive a request for use of a courier to delivery package 150 to a delivery location by user 102, determine user 102 can delivery package 150 to the location, determine user 102 is trusted as the courier to delivery package 150 to the location, and arrange pickup of package 150 from a seller location for a seller corresponding to seller device 160. In this regard, courier services module 180 may correspond to specialized hardware and/or software to access information indicative of a location of a user, such as user 102 acting as a courier for an item purchased by user 104 as discussed herein. The information may be location information generated by a check-in by user 102 at a location; GPS coordinates for user 102, and/or a connection between communication device 110 and a device or beacon at the location. The information may also be a calendar, schedule, recent purchase history, or other information that may be processed to determine a location for user 102. For example, a schedule having an upcoming meeting or appointment at a location may be processed to determine that user 102 may be located at the location. The location information may be associated with a location at, nearby, or with a specified proximity of the seller corresponding to seller device 160.

Once location information for user 102 is determined, courier services module 180 may determine whether a current location for user 102 in the location information is associated with the seller's location for the seller corresponding to seller device 160 (e.g., the seller possessing an item for delivery to user 104). The current location may be associated with the seller's location if user 102 can act as a courier by traveling to the seller's location to pick up the item for delivery to user 104. User 102 may set preferences of how far user 102 will travel to pick up an item for delivery from user 102's current location. Moreover, courier services module 180 may determine how far user 102 may travel based on a mode of transportation for user 102 and/or present traffic conditions for how long it may take user 102 to travel to the seller's location.

Courier services module 180 may further determine whether user 102 is trusted to act as a courier. Courier services module 180 may access the location information to determine whether user 102 may be trusted as the courier, for example, using a reason for user 102 to be located at, traveling to, or visiting the location at or nearby the seller's location. User 102 may be traveling to the location due to an appointment, meeting, purchase from the seller or nearby merchant, or other reason. Such reasons may be indicative of no malicious intent by user 102 for being located in a similar area to the seller. Absent such a reason, courier services module 180 may determine that user 102 may have a higher degree of fraud when located nearby the seller. However, without a reason for visiting the area, user 102 may still be trusted as a courier based on other information about user 102. For example, service provider server 170 may include personal and/or financial information for user 102 that may be indicative of a higher trust in user 102 as a courier. User 102 may also be a high profile or volume seller on a marketplace offered by service provider server 170, or may utilize a payment services account of service provider server 170, which may be indicative of trustworthiness of user 102. Moreover, courier services module 180 may access information that user 102 is a trusted contact of user 104, such as a social networking contact, family member or friend, or other known contact (e.g., employee, coworker, etc.). A trust rating (e.g., a score) may be determined as to whether user 102 may be trusted as a courier. The trust rating may be required to match exceed a threshold amount/score in order for user 102 to be trusted as a courier.

If user 102 is trusted as a courier, courier services module 180 may generate an authorization for the seller corresponding to seller device 170 to release package 150 to user 102 for delivery to user 104. The authorization may include an authorization code for release of package 150. The authorization code may be a shared secret between the seller and user 102, or may be a code that the seller verifies using courier services module 180 when user 102 provides the code to the seller. The authorization code may also include a code for a dispenser, locker, or other device that may release package 150 to user 102. Once package 150 is released to user 102, user 102 may deliver package 150 to user 104. Courier services module 180 may provide user 102 and user 104 with contact information for each other so that user 102 may arrange delivery with user 104 is necessary.

As described above, courier services module 180 may select user 102 as the courier based on location information for user 102 and a trust rating for user 102. In further embodiments, courier services module 180 may also determine a radius of coverage for user 102 in order to determine whether user 102 may be utilized as a courier. The radius of coverage may correspond to preferences set by user 102, such as a distance user 102 will travel and/or an amount of time user 102 will spend traveling (e.g., inclusive of traffic factors). The radius of coverage may be dynamic depending on traffic conditions, time of day, weather conditions, or other factors. The radius of coverage may also depend on a transportation means by user 102, such as foot, bicycle, or vehicle. In various embodiments, the radius of coverage may also depend on a time that user 104 requires the item by. Thus, if user 104 requires an item in 10 minutes, courier services module 180 may filter out any potential couriers traveling on foot when the delivery location is 3 miles from the seller location.

Courier services module 180 may further determine additional items that user 104 may deliver to further users requesting courier services of items in possession of the seller corresponding to seller device 160 and/or located at the delivery location for package 150 to user 104. For example, the seller may be in possession of a second item for delivery to another user not shown in environment 100. The second item may be in an area of coverage for user 104 so that user 104 may deliver the second item. However, the second item may not be in an area of coverage for user 102 (or user 102 may have selected not to deliver the second item). Selection of user 104 as the courier may be performed in the same or similar manner as discussed above in reference to selection of user 102 as the courier. If user 104 is selected as a courier for the additional item to the other user, user 102 may be provided with the additional item with package 150 (e.g., in another package potentially including tracking means similar to package 150). User 102 may deliver package 150 with the additional item to user 104. In other embodiments, the delivery location selected by user 104 may already have the additional item (e.g., delivered by another courier and waiting at the delivery location for user 104). User 104 may then be required to deliver the additional item to the delivery location selected by the other user. In a similar manner, a chain of delivery may be continued so that a plurality of other users may receive packages from the seller and/or other sellers.

Delivery locations selected by user 104 and/or other users may correspond to home, work, or other personal locations where a user may accept a package. However, courier services module 180 may also determine participating merchants that may accept delivery of a delivery package (e.g., package 150) and hold the package for user 104 and/or the other users. User 104 and/or the other users may view a map of participating merchants provided by courier services module 180 and select delivery to one or more of the participating merchants. The participating merchants may then accept delivery of the package(s) and hold the package(s) for release to user 104 and/or the other users. Another authorization code, shared secret, or other verification tool may be utilized by user 104 and/or the other users to receive the package(s).

Courier services module 180 may also determine incentives to provide user 102/104 if user 102/104 acts as a courier for package 150 and/or additional items/packages. An incentive may be tied to an account for user 102/104, such as a courier account with a rating and/or review history. The incentive may increase a rating of the account indicating trustworthiness of user 102/104 as a courier and/or seller. The incentives may also correspond to benefits, offers, gift cards, etc., that may be utilized with a merchant marketplace and/or payment provider service. An incentive may be offered by the seller associated with seller device 160 and/or a buyer, for example, a credit to an item offered by the buyer or seller. Moreover, the incentive may also correspond to monetary payments that may be made to an account of the courier.

Marketplace module 172 may correspond to one or more processes to execute modules and associated specialized hardware of service provider server 170 to provide an online merchant marketplace where one or more sellers (e.g., the seller corresponding to seller device 160) may generate sale offers and postings for items that the sellers offer for sale. In this regard, marketplace module 172 may correspond to specialized hardware and/or software to provide an online marketplace accessible over network 190. The online marketplace may be accessible through a web browser and thus correspond to a website, or may be accessible using a dedicated application for service provider server 170. Marketplace module 172 may facilitate transactions for the items offered for sale from the sellers and may process payments for the transactions, for example, using a payment provider service. Once a sale transaction is complete, marketplace module 172 may further arrange delivery of the item, including delivery using courier services provided by courier services module 180. Thus, marketplace module 172 may provide user interfaces allowing for select of courier services, input of delivery information, and display of courier information, including name/identification of the courier, time for delivery, and/or authorization codes.

In various embodiments, service provider server 170 includes other applications 174 as may be desired in particular embodiments to provide features to service provider server 170. For example, other applications 174 may include security applications for implementing client-side security features, programmatic client applications for interfacing with appropriate application programming interfaces (APIs) over network 190, or other types of applications. Other applications 174 may contain software programs, executable by a processor, including a graphical user interface (GUI), configured to provide an interface to user 102 when accessing service provider server 170. In various embodiments where not provided by courier services module 180 and/or marketplace module 172, other applications 174 may include connection and/or communication applications, which may be utilized to communication information to communication device 110/130 and/or seller device 160.

Additionally, service provider server 170 includes database 176. As previously discussed, user 102/104 and/or the seller corresponding to seller device 160 may establish one or more accounts with service provider server 170. Accounts in database 176 may include user/seller information, such as name, address, birthdate, payment/funding information, additional user financial information, and/or other desired user data. User 102/104 and/or the seller may link to their respective accounts through a user, merchant, and/or device identifier. Thus, when an identifier is transmitted to service provider server 170, e.g. from communication device 110/130 and/or seller device 160, an account belonging to user 102/104 and/or the seller may be found. Payment amounts may be deducted from one account and paid to another account. Additionally, the accounts may be used to track user information, courier services, and/or selling histories. In other embodiments, user 102/104 and/or the seller may not have previously established an account and may provide other financial information to service provider server 170 to complete financial transactions and utilize courier services, as previously discussed. Database 176 may further include information used by courier services module 180, such as user input for courier services, location information, trustworthiness information, and/or delivery information.

In various embodiments, service provider server 170 includes at least one network interface component 178 adapted to communicate communication device 110/130 and/or seller device 160 over network 190. In various embodiments, network interface component 178 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 190 may be implemented as a single network or a combination of multiple networks. For example, in various embodiments, network 190 may include the Internet or one or more intranets, landline networks, wireless networks, and/or other appropriate types of networks. Thus, network 190 may correspond to small scale communication networks, such as a private or local area network, or a larger scale network, such as a wide area network or the Internet, accessible by the various components of system 100.

Figure 2A:
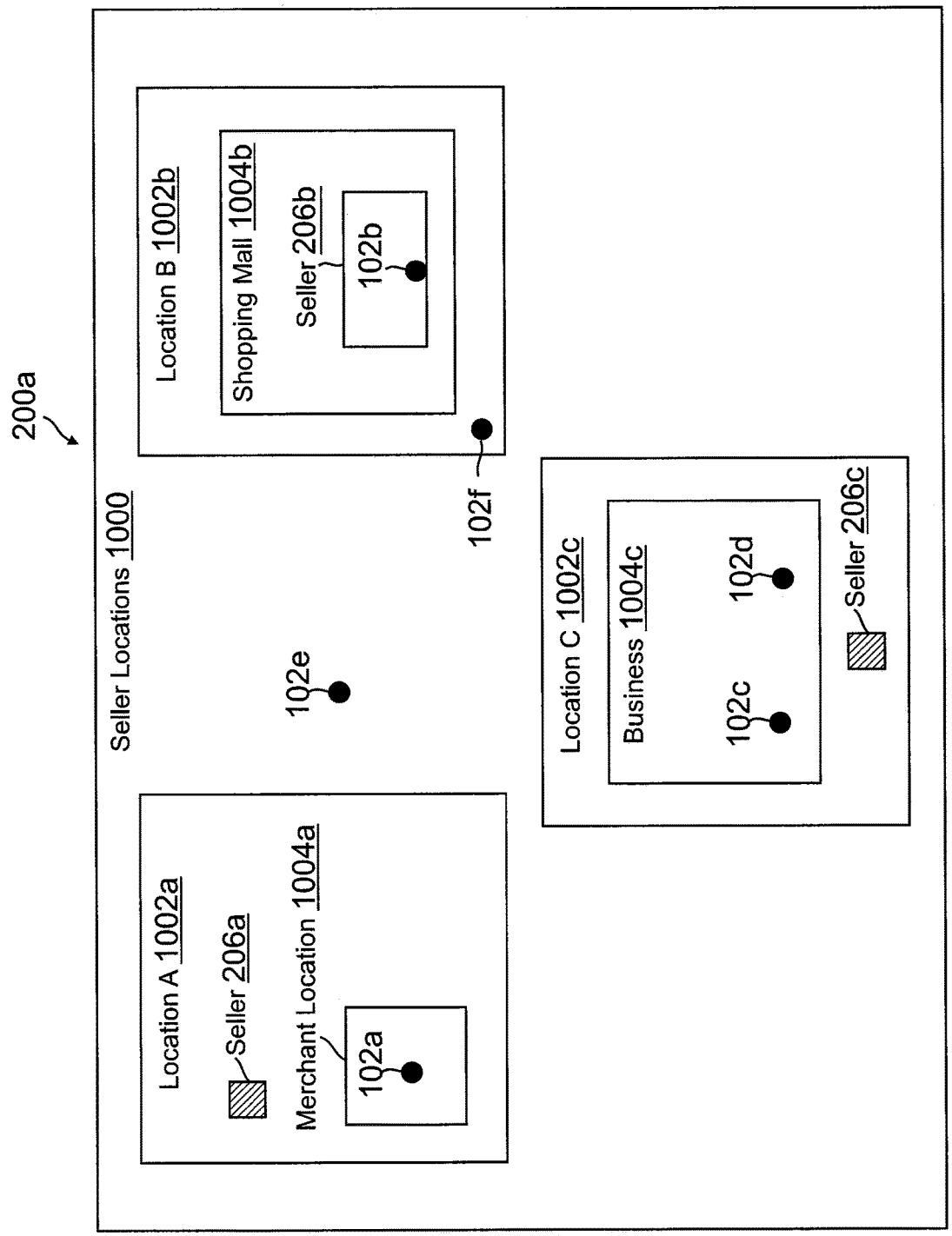
FIG. 2A is an exemplary environment where couriers nearby a seller may be determined for delivery of items to one or more buyers, according to an embodiment.

FIG. 2A is an exemplary environment where couriers nearby a seller may be determined for delivery of items to one or more buyers, according to an embodiment. Environment 200a of FIG. 2 includes a user 102a, a user 102b, a user 102c, a user 102d, a user 102e, and a user 102f all corresponding generally to user 102 potentially acting as a courier in FIG. 1 and having communication device 110.

Environment 200*a* includes seller locations 1000 that may correspond to a geographic region (e.g., town, city, county, state, or other geographic region) where one or more sellers may be located and require courier services to delivery locations for buyers of the seller's items. Thus, seller locations 1000 include a location A 1002*a*, a location B 1002*b*, and a location C 1002*c*. In location A 1002*a*, a seller 202*a* may be located nearby a merchant location 1004*a* where user 102*a* is located. Seller 206*a* may correspond to a personal seller of an online marketplace, such as an individual seller. Seller 206*a* may have set location A 1002*a* as the distance to search for couriers, for example, based on how quickly seller 206*a* requires a courier, travel by the courier, or other parameter. Thus, seller 206*a* may be located in an office, home, or other location nearby merchant location 1004*a*. Seller 206*a* may require courier services instead of delivery services, and thus request information on nearby couriers to seller 206*a*. As shown in environment 200*a*, user 102*a*, a potential courier, is located within merchant location 1004*a* that is nearby seller 206*a*. User 102*a* may be identified in merchant location 1004*a* through a purchase user 102*a* has made in merchant location 1004*a*, through location coordinates that user 102*a* has provided to a service provider, and/or through a short range wireless connection made between a communication device of user 102*a* and a device/beacon within merchant location 1004*a*. Thus, if user 102*a* is trusted as a courier, a service provider may inform seller 206*a* of the presence of user 102*a* and allow for seller 206*a* to select user 102*a* as a courier. Conversely, user 102*e* is shown as located outside of location A 1002*a* and thus may not be suggested as a courier even if user 102*e* is trusted as a courier.

Location B 1002*b* shows another location to search for couriers that a seller 206*b* may require for delivery of an item. Location B 1002*b* includes a shopping mall 1004*b* having seller 206*b* located within shopping mall 1004*b*. Additionally, a user 102*b* and a user 102*f* are shown within location B 1002*b*. Thus, users 102*b* and 102*f* may be selected as couriers if users 102*b* and 102*f* are determined to be trusted as couriers to seller 206*b*. User 102*b* may be identified as located within location B 1002*b* based on a check-in or purchase from seller 206*b*. Moreover, user 102*f* may be identified within location B 1002*b* based on connections, check-ins, and/or GPS coordinates. However, the service provider may select user 102*b* to be the courier over user 102*f* based on the proximity that user 102*b* is to seller 206*b* (e.g., within seller 206*b*'s store). Such a selection may further be based on time and/or travel constraints.

In location C 1002*c*, a business 1004*c* includes two potential couriers 202*c* and 202*d*. A seller 206*c* is located nearby business 1004*c* and within location C 1002*c* such that users 102*c* and 102*d* may have location information corresponding to seller 206*c*. Moreover, as shown in location C 1002*c*, users 202*c* and 202*d* are about equal distance from seller 206*c*. However, a service provider may select user 202*c* to act as the courier where user 202*d* is not trusted as a courier. For example, user 202*d* may not have a reason for visiting business 1004*c*, while user 202*c* may have an appointment, work at, or otherwise have a reason for being located at business 1004*c*. Moreover, information about user 202*d* may not be sufficient to support a trust finding in user 202*d*. The service provider may not have personal/financial information, user 202*d* may have no past history of courier use and/or seller transactions, and/or user 202*d* may not be a contact of a buyer requiring the item for delivery from seller 206*c*. Thus, the service provider may select user 202*c* as the courier where user 202*c* may be trusted as a courier.

Figure 2B:
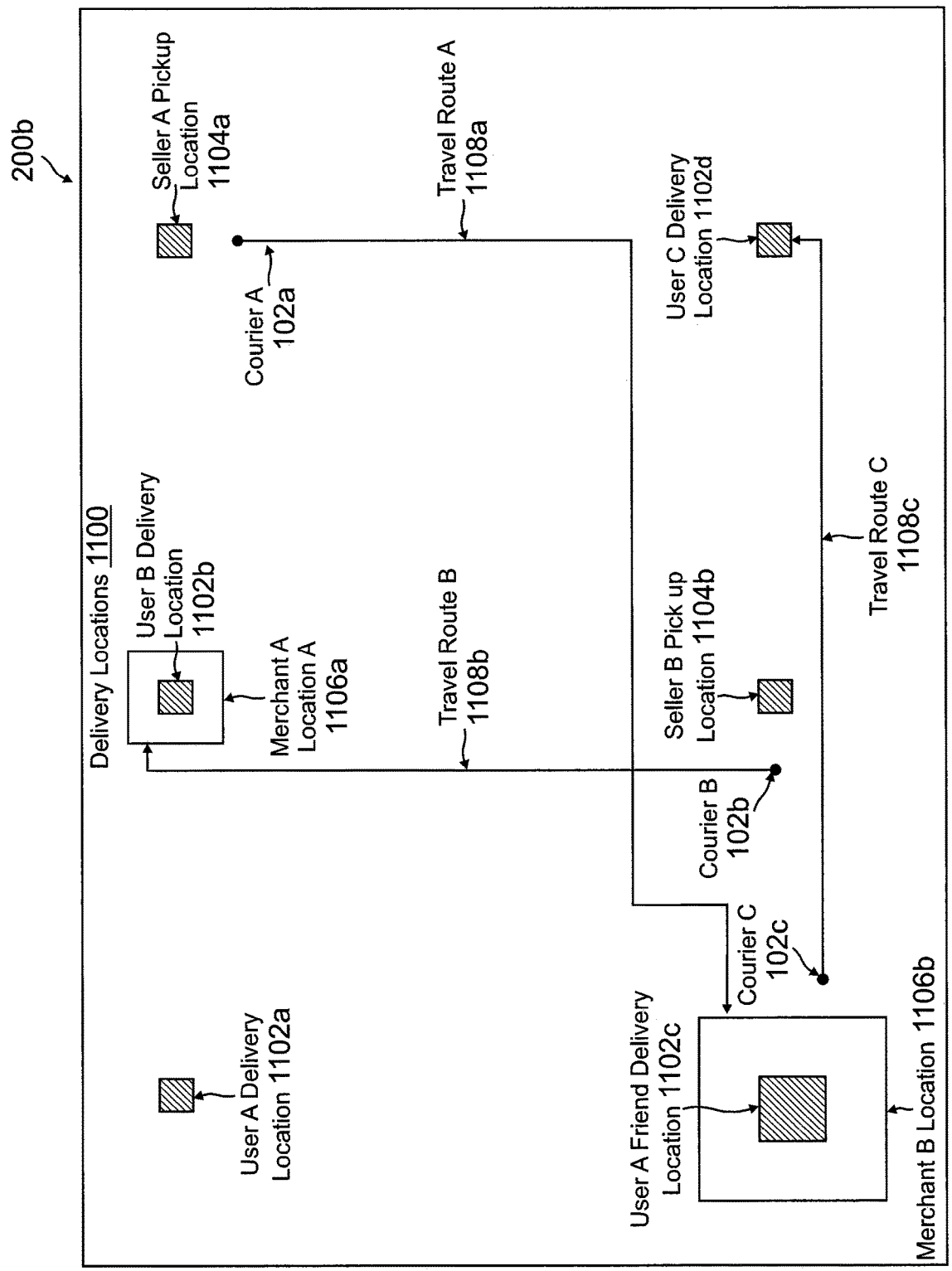
FIG. 2B is an exemplary environment where couriers traveling to locations in the environment may accept delivery of an item to one or more locations the couriers are traveling to, according to an embodiment.

FIG. 2B is an exemplary environment where couriers traveling to locations in the environment may accept delivery of an item to one or more locations the couriers are traveling to, according to an embodiment. Environment 200*b* includes a courier 102*a*, a courier 102*b*, and a courier 102*c* all corresponding generally to user 102 of FIG. 1 after selection as a courier for an item.

Environment 200*b* includes delivery locations 1100 having a user A delivery location 1102*a*, a user B delivery location 1102*b*, a user A friend delivery location 1102*c*, and a user C delivery location 1102*d*. Moreover, delivery locations 1100 include a seller A pickup location 1104*a* and a seller B pickup location 1104*b*. In environment 200, couriers 102*a*-*c* have been selected as couriers for one or more items based on their travel routes. Thus, a service provider server may have previously received location information for couriers 102*a*-*c* as well as travel route information, such as one or more destinations points from couriers 102*a*-*c*'s current location. In this regard, the service provider may have selected courier 102*a* to deliver items for buyers user A (not shown) and user C (not shown). A seller A (not shown) at seller A pickup location 1104*a* may possess items for delivery to both user A and user B. The service provider may have determined that no available nearby couriers (e.g., courier 102*a*) are traveling to user A delivery location 1102*a*, and thus be able to drop off an item for user A's retrieval at user A delivery location 1102*a*. Moreover, the service provider may similarly determine that no available nearby couriers are traveling directly to user C delivery location 1102*d*. Thus, seller A having items for user A and user C may require other courier services for delivery of the items.

However, the service provider may determine that courier A 102*a* is traveling travel route A 1108*a* to merchant B location 1106*b*, that may include a participating merchant that may hold on to delivery items for user A and user C. A friend of user A may be traveling to merchant B location 1106*b* and able to pick up the items at user A friend delivery location 1102*c*. Seller A may then provide the items for user A and user C to courier A 102*a*, who may take travel route A 1108*a* to merchant B location 1106*b* and deliver the items to user A friend delivery location 1102*c*. The friend of user A may then retrieve just user A's items when visiting merchant B location 1106*b*. Thus, the participating merchant may further hold on to user C's items at merchant B location 1106*b*.

However, the friend may also act as courier C 102*c*. In other embodiments, courier C 102*c* may correspond to a different person than the friend as well. Courier C 102*c* may be local to merchant B location 1106*b* and traveling along travel route C 1108*c* to user C delivery location 1102*d*. Thus, courier C 102*c* may pick up user C's items from merchant B location 1106*b* and deliver the items to user C delivery location 1102*d* along travel route C 1108*c*. User C delivery location 1102*d* is not shown within a merchant location and may correspond to a personal, work, or other location where a user may accept delivery. By utilizing courier A 102*a*, the service provider may provide for chain delivery of items for user A and user C without sending one courier along an undesirable travel route.

Although courier C 102*c* is shown as passing seller B pickup location 1104*b*, courier C 102*c* is not traveling to a merchant A location 1106*a* having user B delivery location 1102*b*. Thus, the service provider may determine it would be undesirable to have courier C 102*c* deliver an item held by a seller B (not shown) at seller B pickup location 1104*b* for a user B (not shown) accepting delivery at user B delivery location 1102b. Thus, the service provider may utilize a separate courier, courier B 102b, that is taking travel route B 1108b to merchant A location 1106a. Courier B 102b is local to seller B at seller B pickup location 1104b and may retrieve the item for user B. Courier B 102b may then deliver the item to merchant A location 1106a along travel route B 1008b for retrieval by user B at user B delivery location 1102b. Merchant A location 1106a may include a participating merchant that may then hold the items for release to user B.

Figure 3A:
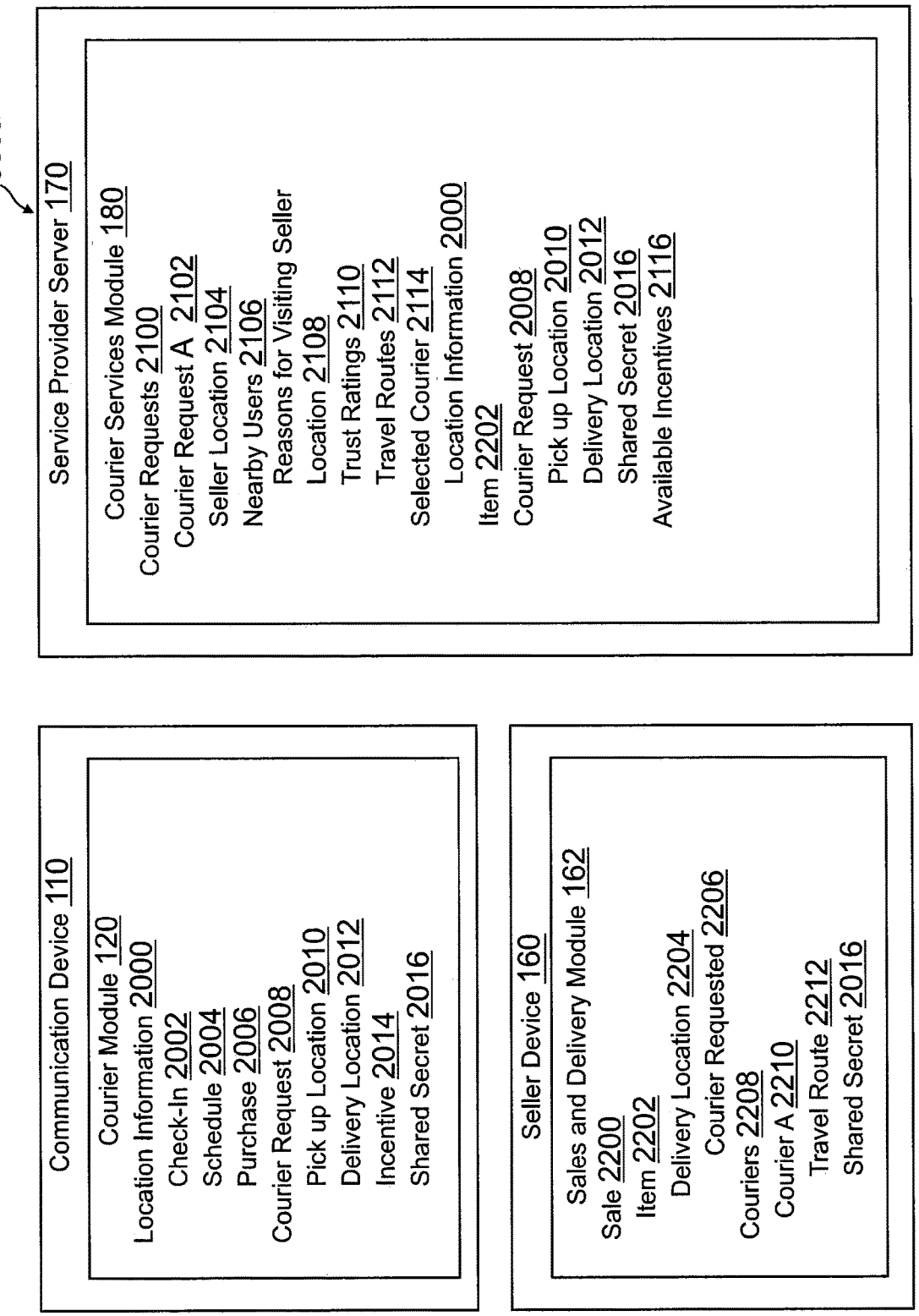
FIG. 3A is an exemplary system environment having a communication device and a merchant device arranging delivery of an item to a user based on a whether the user is trusted as a courier, according to an embodiment.

FIG. 3A is an exemplary system environment having a communication device and a merchant device arranging delivery of an item to a user based on a whether the user is trusted as a courier, according to an embodiment. Environment 300a of FIG. 3 includes communication device 110, seller device 160, and service provider server 170 of FIG. 1. The below described hardware and/or software modules execute functions as described herein with respect to environment 100.

Communication device 110 executes courier module 120 having specialized hardware and/or software modules and processes described herein in reference to courier module 120/140 of FIG. 1. In this regard, courier module 120 includes location information 2000, which may be utilized to determine a location for the user of communication device 110, such as a courier. Location information 2000 includes check-in 2002, schedule 2004, and purchase 2006, which all may be utilized to determine a location for the user. Location information 2000 may be communication to service provider server 170 for processing to determine courier request 2008. Courier request 2008 may be determined for the user of communication device 110, as discussed herein, where courier request 2008 may be displayed to the user through courier module 120 for acceptance. Thus, courier request 2008 include pickup location 2010, delivery location 2012, incentive 2014, and shared secret 2016. The user may then review the aforementioned information and choose whether to accept courier request 2008.

Seller device 160 executes sales and delivery module 162 having specialized hardware and/or software modules and processes described herein in reference to sales and delivery module 162 of FIG. 1. In this regard, sales and delivery module 162 includes information that may be utilized to request courier services for delivery of an item in possession of a seller associated with seller device 160. In this regard, sales and delivery module 162 includes a sale 2200 for an item 2202, which may be in the seller's possession. The buyer may set a delivery location 2204 for item 2202 and may select to have a courier requested 2206. Sales and delivery module 162 further may include couriers 2208, which may be used for delivery of item 2202. Couriers 2208 includes courier A 2210 having a travel route 2212 that courier A 2210 may take for delivery of item 2202 and a shared secret 2016 for identification and verification of courier A 2210.

Service provider server 170 executes courier services module 180 having specialized hardware and/or software modules and processes described herein in reference to courier services module 180 of FIG. 1. In this regard, courier service module 180 includes determined courier requests 2100, such as a courier request A 2102, which may be communicated to communication device 110. Courier request A 2012 may be determined using seller location 2104 and nearby users 2106. For each of nearby users 2106, courier services module 180 may include a reason for visiting seller location 2108, trust ratings 2110, and travel routes 2112. Courier request A 2102 further includes a selected courier 2114 from the aforementioned information, which may have location information 2000 from communication device 110. Courier request A 2102 includes an item 2202, and may generate courier request 2008 for communication to communication device 110. Additionally, courier request A 2102 may include available incentives 2116, which may be used with courier request 2008 to incentivize a user to act as a courier.

Figure 3B:
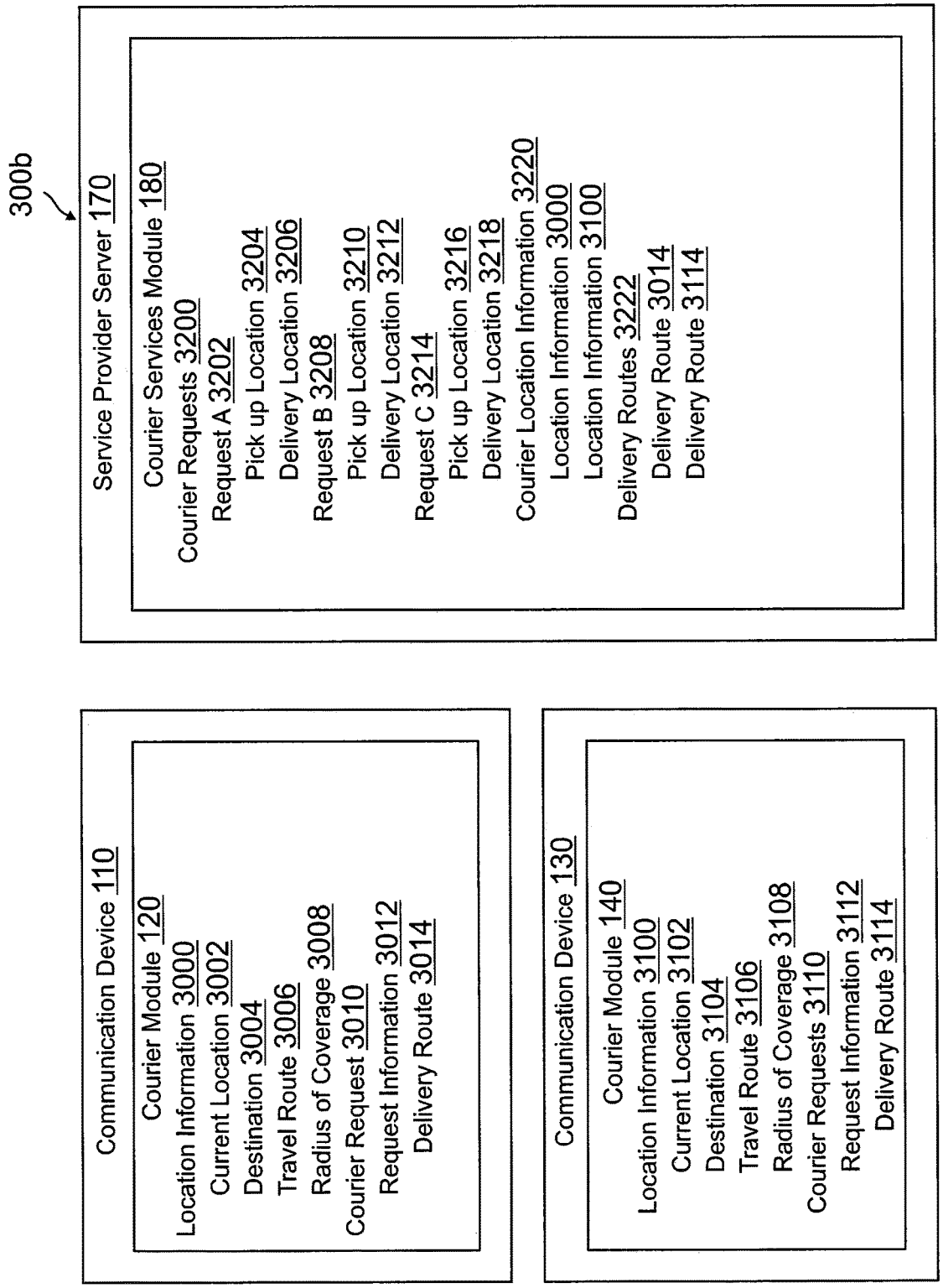
FIG. 3B is an exemplary system environment having communication devices of two couriers receiving item delivery instructions based on the courier trust relationship rating and travel route, according to an embodiment.

FIG. 3B is an exemplary system environment having communication devices of two couriers receiving item delivery instructions based on the courier trust relationship rating and travel route, according to an embodiment. Environment 300a of FIG. 3 includes communication device 110, communication device 130, and service provider server 170 of FIG. 1. The below described hardware and/or software modules execute functions as described herein with respect to environment 100.

Communication device 110/130 executes courier module 120/140 having specialized hardware and/or software modules and processes described herein in reference to courier module 120/140 of FIG. 1. In this regard, courier module 120/140 both include information used to determine whether the first user associated with communication device 110 or the second user associated with communication device 130 may act as a courier for delivery of one or more items from one or more sellers. Thus, courier module 120 includes location information 3000 for the first user, which may include current location 3002, destination 3004, travel route 3006, and radius of coverage 3008. Using location information 3000, service provider server 170 may determine courier requests 3010 particular to the first user, which may include request information 3012 and delivery route 3014. Similarly, courier module 140 includes location information 3100 for the second user, which may include current location 3102, destination 3104, travel route 3106, and radius of coverage 3108. Using location information 3000, service provider server 170 may determine courier requests 3110 particular to the second user, which may include request information 3112 and delivery route 3114.

Service provider server 170 executes courier services module 180 having specialized hardware and/or software modules and processes described herein in reference to courier services module 180 of FIG. 1. In this regard, courier service module 180 includes courier requests 3200 determined for the first and second users of communication device 110 and 130, respectively. Courier requests 3200 includes a request A 3202 having a pickup location 3204 and a delivery location 3206. Courier requests 3202 also includes a request B 3208 having a pickup location 3210 and a delivery location 3212 and a request C 3214 having a pickup location 3216 and a delivery location 3218. Courier services module 180 may determine courier requests 3200 using courier location information 3220, such as location information 3000 for the first user and location information 3100 for the second user. Utilizing the aforementioned information, courier requests 3200 may be determined having delivery routes 3222, for example, delivery route 3014 provided to the first user and delivery route 3114 provided to the second user.

Figure 4:
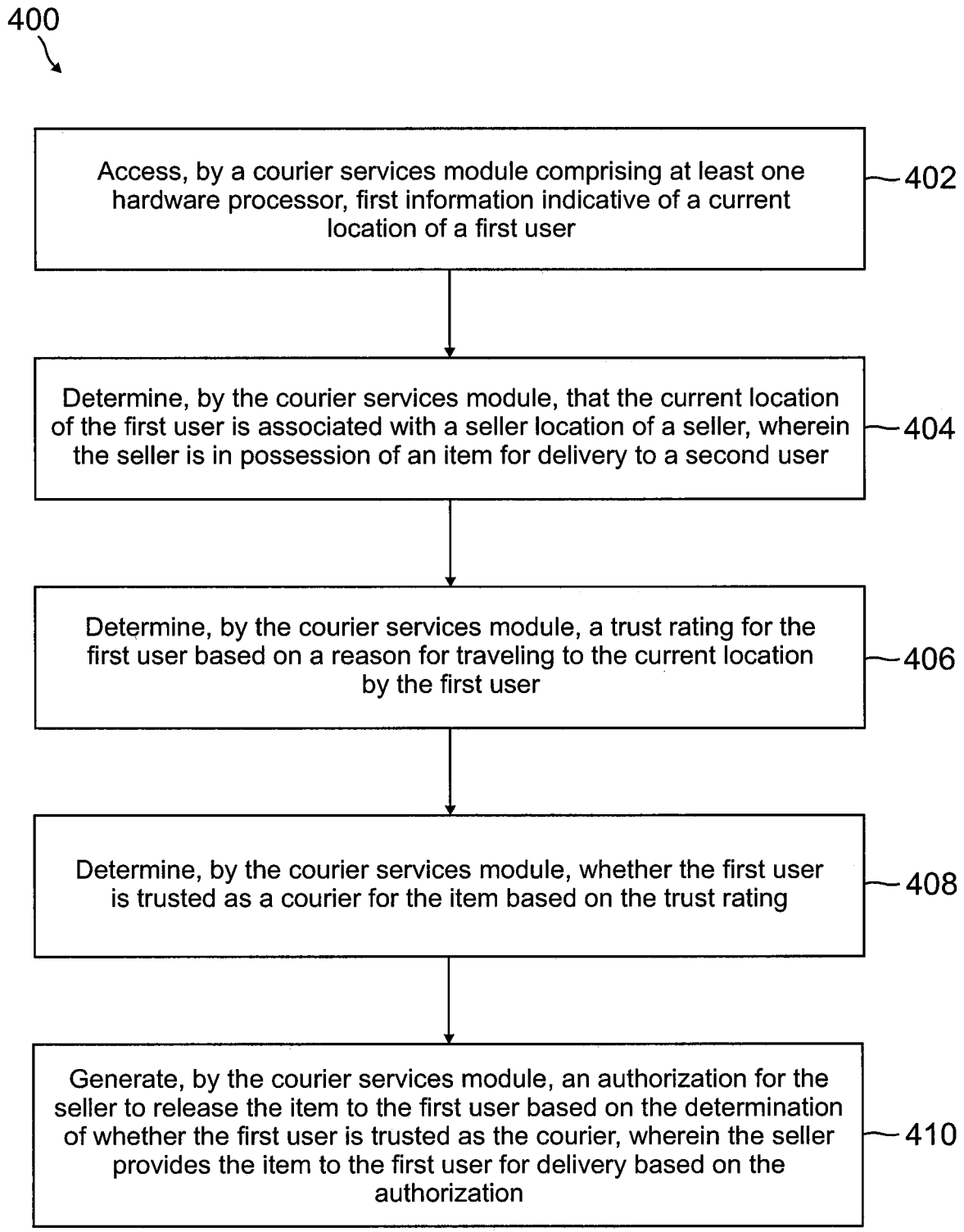
FIG. 4 is a flowchart of an exemplary process for location detection devices for use in a courier services network, according to an embodiment.

FIG. 4 is a flowchart of an exemplary process for location detection devices for use in a courier services network, according to an embodiment. Note that one or more steps, processes, and methods described herein may be omitted, performed in a different sequence, or combined as desired or appropriate.

At step 402, first information indicative of a current location of a first user is accessed, by a courier services module comprising at least one hardware processor. For example, first location information may be received from a wireless beacon associated with the first location, wherein the wireless beacon connects with a communication device in possession of the first user to generate the first location information. The wireless beacon and the communication device nay connect using one of near field communication, radio communication, infrared communication, Bluetooth communication, Bluetooth Low Energy (BLE) communication, WiFi communication, and LTE Direct communication. In other embodiments, a schedule for the first user may be received from a communication device in possession of the first user, wherein, prior to the courier services module accessing the first location information, the courier services module further determines the first location information using the schedule of the first user. The schedule may comprise at least one of the first user's appointments, the first user's meetings, travel routes travelled by the first user, and calendar information for the first user. In further embodiments, transaction information may be received from a seller device of the seller, wherein, prior to the courier services module accessing the first location information, the courier services module further determines the first location information using the transaction information. The transaction information may comprise a purchase by the first user with one of the seller and a merchant in proximity to the seller.

At step 404, the courier services module determines that the current location of the first user is associated with a seller location of a seller, wherein the seller is in possession of an item for delivery to a second user. The current location may match the seller location when a user location for the first user in the first location information is within a specified proximity of the seller location of the seller. The specified proximity may depend on a mode of travel used by the first user, and wherein the mode of travel is one of walking, bicycle, and vehicle.

A trust rating for the first user is determined, by the courier services module, based on a reason for traveling to the current location by the first user, at step 406. Thus, at step 408, the courier services module determines whether the first user is trusted as a courier for the item based on the trust rating. The reason for visiting the first location by the first user may comprise one of a scheduling appointment by the first user at the first location, a transaction conducted by the first user with one of the seller and a merchant in proximity to the seller, and a past history of the first user traveling to or being located at the first location. Prior to the courier services module determining the trust rating, the courier services module may access user information for the first user, wherein the user information comprises at least one of a schedule for the user, a travel route for the user, a check-in by the user at the current location, and a purchase by the user with one of the seller and a merchant location in proximity to the seller. Thus, the reason for traveling to the current location may be determined using the user information. The user information may further comprise past deliveries by the first user for at least one past item to at least one past purchasing user, wherein the trust rating is further determined using the past deliveries by the first user. The user information may also further comprise a seller history for the first user using an online merchant marketplace associated with the seller, wherein the trust rating is further determined using the seller history. The user information may comprise social networking contacts of at least one of the first user and the second user, wherein the first user is a social networking contact of the second user, and wherein the trust rating is further determined using the social networking contacts.

At step 410, an authorization for the seller to release the item to the first user is generated, by the courier services module, based on the determination of whether the first user is trusted as the courier, wherein the seller provides the item to the first user for delivery based on the authorization. The authorization may comprise a verification code. The verification code may be communicated to both of the first user and the seller, wherein the first user provides the verification code to the seller to verify an identity of the first user. In other embodiments, the verification code may be communicated to the first user only, wherein the first user provides the verification code to the seller, and wherein the seller verifies an identity of the first user with the courier services module using the verification code. Additionally, the second user may provide second location information for delivery of the item, wherein the second location information comprises at least one of a second location of the second user, a travel route for the second user, and a merchant location visited by the second user.

Figure 5:
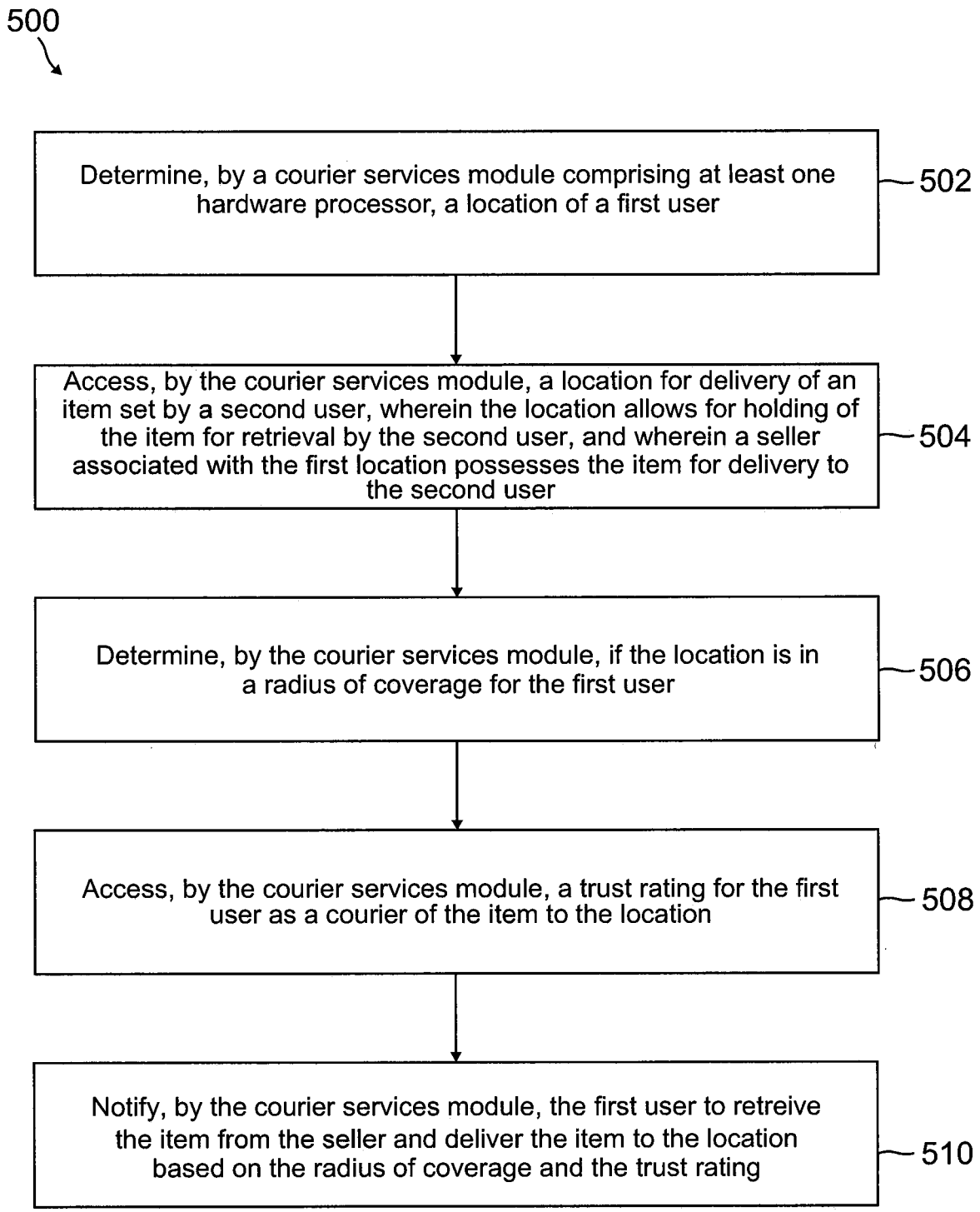
FIG. 5 is a flowchart of an exemplary process for communication device interfaces providing courier service information, according to an embodiment.

FIG. 5 is a flowchart of an exemplary process for communication device interfaces providing courier service information, according to an embodiment. Note that one or more steps, processes, and methods described herein may be omitted, performed in a different sequence, or combined as desired or appropriate.

At step 502, a location for a first user is determined, by a courier services module comprising at least one hardware processor. The location for the first user may be determined using connections between a communication device for the first user and a device/beacon, or through information available about the first user. A location for delivery of an item set by a second user is accessed, by the courier services module, wherein the location allows for holding of the item for retrieval by the second user, and wherein a seller associated with the first location possesses the item for delivery to the second user, at step 504. The location may be a home, work, or other address location. Additionally, the location may be a participating merchant having inventory space available for holding of the item. The participating merchant may require the second user to present an authorization code or shared secret for release of the item to the second user. Additionally, the second user may view participating merchant locations on a map of a communication device to select the participating merchant as the location for delivery.

At step 506, the courier services module determines if the location is in a radius of coverage for the first user. The radius of coverage may depend on a delivery time required by the second user. The delivery time may be affected by traffic conditions on a travel route to the location for delivery of the item. The radius of coverage may correspond to preferences set by the first user and/or a mode of transportation by the first user. The radius of coverage may be dynamic, and may also correspond to a distance away from a travel route the first user is utilizing to travel between two or more points. At step 508, a trust rating for the first user as a courier of the item to the location is accessed. In order for the first user to be trusted as a courier, the trust rating may be required to meet or exceed a threshold amount. Thus, at step 510, the first user is notified, by the courier services module, to retrieve the item and deliver the item to the location based on the radius of coverage and the trust rating. The first user may also be provided an incentive for delivery of the item, such as a benefit for a user account of the first user and/or a benefit with the seller or a merchant marketplace.

The courier services module may also determine whether the seller possesses one or more additional items to deliver to further users, such as a third user. The courier services module may determine if a travel route and/or radius of coverage for the second user is inclusive of a delivery location for the additional item(s) to the third user. If so, the courier services module may alert the seller to provide the additional item(s) to the first user. The first user may deliver the item for the second user to the second user's delivery location with the additional item(s). The courier services module may the request the second user to deliver the additional item(s) to the delivery location for the third user. Further deliveries may also be made by the third user such that a chain of deliveries may be performed.

Figure 6:
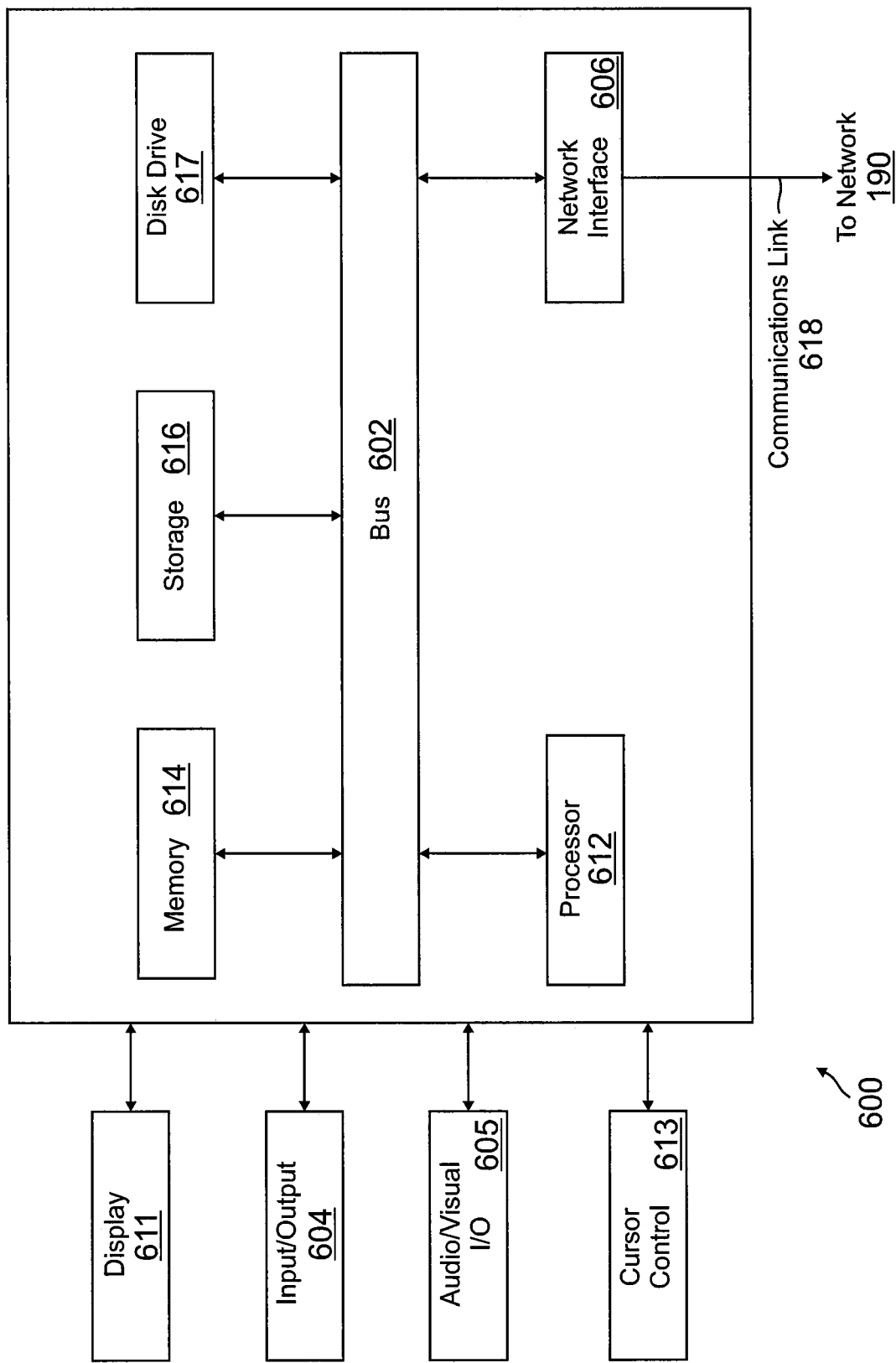
FIG. 6 is a block diagram of a computer system suitable for implementing one or more components in FIG. 1, according to an embodiment.

FIG. 6 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 190. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, in-store purchases have been described, but advantages discussed herein may also be achieved through online purchases. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
one or more processors, one or more computer-readable memories, with program instructions stored on the one or more computer-readable memories, the one or more processors configured to execute the program instructions to cause the system to perform operations comprising:
determining that a first user, via a first user device, has ordered a first item from a merchant;
detecting a short range wireless connection between a second user device of a second user and a wireless beacon device at a merchant location associated with the first item;
in response to the detecting, determining a past delivery history performed by the second user on behalf of at least one of the merchant or a service provider associated with the system that provides a delivery service through the second user;
determining a trust rating for the second user based on the past delivery history;
determining that the second user is a trusted courier for the first item based on the trust rating;
predicting that the second user will be within a first threshold distance of a first location of the first user within a first time period;
selecting the second user as the trusted courier of the first item based on the detecting the short range wireless connection and the predicting; and
in response to the selecting, transmitting an electronic message to a merchant device of the merchant, the electronic message including information that authorizes the merchant to release the first item to the second user.

2. The system of claim 1, wherein the determining that the second user is the trusted courier for the first item is further based on one or more past transactions involving the second user.

3. The system of claim 1, wherein the determining that the second user is the trusted courier for the first item includes determining that the second user is a social media contact of the first user.

4. The system of claim 1, wherein the determining that the second user is the trusted courier for the first item is further based on one or more past transactions involving the second user and the first user.

5. The system of claim 1, the operations further comprising:
determining that a third user is within a second threshold distance of the first location, wherein the third user has ordered a second item from the merchant; and
in response to determining that the third user is within the second threshold distance of the first location, transmitting a second electronic message to the merchant device of the merchant, the second electronic message including information that authorizes the merchant to release the second item to the second user.

6. The system of claim 1, wherein the predicting that the second user will be within the first threshold distance of the first location of the first user within the first time period includes determining a current location of the second user is within the first threshold distance.

7. The system of claim 1, wherein predicting that the second user will be within a threshold distance of the first location of the first user within the first time period includes analyzing a scheduled travel route corresponding to the second user.

8. A method comprising:
determining that a first user, via a first user device, has ordered a first item from a merchant;
detecting a short range wireless connection between a second user device of a second user and a wireless beacon device at a merchant location associated with the first item;
in response to the detecting, determining a past delivery history performed by the second user on behalf of at least one of the merchant or a service provider that provides a delivery service through the second user;
determining a trust rating for the second user based on the past delivery history;
determining that the second user is a trusted courier for the first item based on the trust rating;
predicting that the second user will be within a first threshold distance of a first location of the first user within a first time period;
selecting the second user as the trusted courier of the first item based on the detecting the short range wireless connection and the predicting; and
in response to the selecting, transmitting an electronic message to a merchant device of the merchant, the electronic message including information that authorizes the merchant to release the first item to the second user.

9. The method of claim 8, wherein the determining that the second user is the trusted courier for the first item is further based on one or more past transactions involving the second user.

10. The method of claim 8, wherein the determining that the second user is the trusted courier for the first item includes determining that the second user is a social media contact of the first user.

11. The method of claim 8, wherein the determining that the second user is the trusted courier for the first item is further based on one or more past transactions involving the second user and the first user.

12. The method of claim 11, further comprising:
determining that a third user is within a second threshold distance of the first location, wherein the third user has ordered a second item from the merchant; and
in response to determining that the third user is within the second threshold distance of the first location, transmitting a second electronic message to the merchant device of the merchant, the second electronic message including information that authorizes the merchant to release the second item to the second user.

13. The method of claim 8, wherein the predicting that the second user will be within the first threshold distance of the first location of the first user within the first time period includes determining a current location of the second user is within the first threshold distance.

14. The method of claim 13, wherein predicting that the second user will be within a threshold distance of the first location of the first user within the first time period includes analyzing a scheduled travel route corresponding to the second user.

15. A computer program product comprising:
one or more computer-readable tangible storage devices, and program instructions stored on at least one of the one or more computer-readable tangible storage devices, the program instructions when executed cause a machine to perform operations comprising:
determining that a first user, via a first user device, has ordered a first item from a merchant;

detecting a short range wireless connection between a second user device of a second user and a wireless beacon device at a merchant location associated with the first item;
in response to the detecting, determining a past delivery history performed by the second user on behalf of at least one of the merchant or a service provider that provides a delivery service through the second user;
determining a trust rating for the second user based on the past delivery history;
determining that the second user is a trusted courier for the first item based on the trust rating;
predicting that the second user will be within a first threshold distance of a first location of the first user within a first time period;
selecting the second user as the trusted courier of the first item based on the detecting the short range wireless connection and the predicting; and
in response to the selecting, transmitting an electronic message to a merchant device of the merchant, the electronic message including information that authorizes the merchant to release the first item to the second user.

16. The computer program product of claim 15, wherein the determining that the second user is the trusted courier for the first item is further based on one or more past transactions involving the second user.

17. The computer program product of claim 15, wherein the determining that the second user is the trusted courier for the first item includes determining that the second user is a social media contact of the first user.

18. The computer program product of claim 15, wherein the determining that the second user is the trusted courier for the first item is further based on one or more past transactions involving the second user and the first user.

19. The computer program product of claim 17, the operations further comprising:
determining that a third user is within a second threshold distance of the first location, wherein the third user has ordered a second item from the merchant; and
determining that the third user is within the second threshold distance of the first location, transmitting a second electronic message to the merchant device of the merchant, the second electronic message including information that authorizes the merchant to release the second item to the second user.

20. The computer program product of claim 15, wherein the predicting that the second user will be within the first threshold distance of the first location of the first user within the first time period includes determining a current location of the second user, and further includes analyzing a scheduled travel route corresponding to the second user.

* * * * *